April 18, 1961     R. R. ROUGH     2,979,865
METHOD OF PRODUCING COLOR-CONTROLLED VITREOUS MATERIALS
Filed Feb. 27, 1958
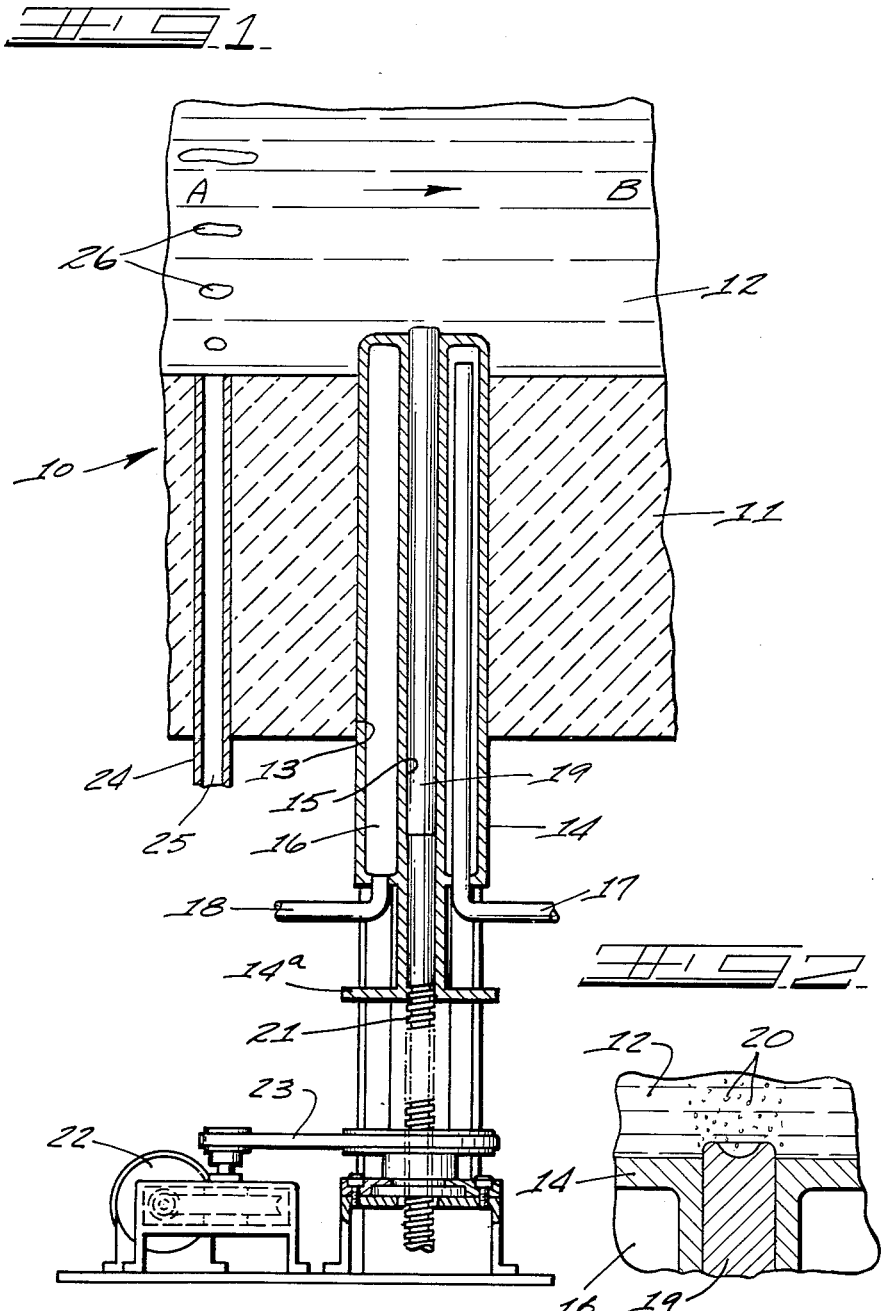
INVENTOR.
R. R. ROUGH
BY E. J. HOLLER &
W. A. SCHAICH
ATTORNEYS

United States Patent Office 2,979,865
Patented Apr. 18, 1961

2,979,865

METHOD OF PRODUCING COLOR-CONTROLLED VITREOUS MATERIALS

Robert R. Rough, Toledo, Ohio, assignor to Owens-Illinois Glass Company, a corporation of Ohio Filed Feb. 27, 1958, Ser. No. 718,000

2 Claims. (Cl. 49—77)

The present invention relates to a method adapted to facilitate the continuous production of molten color-controlled vitreous materials such as glass or ceramics. The invention is particularly applicable to the automatic manufacturing of various color-controlled glasses produced within tank furnaces.

In the conventional processes heretofore employed considerable difficulty has been encountered in continuously producing controllably decolorized or slightly colored glass with certain color-controlling agents. A primary reason for this has been due to the high volatility of constituents such as selenium when introduced with the bulk of the glass batch into the melting chamber of the tank. Decolorizing constituents which contain selenium in its various forms when introduced into the batch have been adversely affected by the excessive heat present in the melting chamber to the extent that substantial losses of such costly constituents have resulted. In order to counteract the high selenium losses normally encountered in the melting chamber, considerably greater amounts than necessary to perform its color-controlling function must be added to the batch. Conventionally to effect a proper degree of decolorization or colorization of the molten glass only a small portion of the total amount of selenium added becomes an effective reactant in the molten glass.

The device and process utilized in accordance with my invention consist of installing a color moderating element within a wall of the glass retaining receptacle and causing the batch of molten glass to flow past the moderating apparatus in contact therewith to effect the color-controlling operation. The decolorizing or colorizing agent may be added to the glass in the hereinafter described manner either within the melting chamber, the refiner, or the forehearth, one region of which is employed as a distributing area to render homogeneous the mixture of molten batch and the color-controlling medium. A homogeneous continuous stream of color-controlled glass is produced in the downstream area immediately adjacent where the color-controlling agent is introduced. The operations of adding the color-controlling agent into the glass batch and rendering the mixture completely uniform is accomplished in a continuous manner while the glass stream flows past the prescribed area to a point of use.

Accordingly, it is an object of the present invention to provide a method for the continuous production of homogeneous color-controlled glass by adding the color-controlling agent to a molten glass stream beneath its surface, the method being adapted to introduce a molten-silicate-soluble element into the glass at a controlled rate.

Another object of the present invention is to provide a method which is applicable to introducing a selenium containing element into molten glass at a controlled rate governed by the degree of colorization or decolorization required and the rate of removal of the color-controlled glass.

A further object of the present invention is to provide an improved method of continuously producing color-controlled molten glass by the addition of a color-controlling medium directly into the glass beneath its surface thereby rendering the same either fully decolorized or slightly colorized as required.

A still further object of the present invention is to provide an improved method of producing a continuous stream of color-controlled molten glass by introducing a rod-shaped selenium-containing element into the molten glass beneath the surface for its controlled dissolution therein while causing the glass to be completely homogenized during the color-controlling operation.

The specific nature of this invention, as well as other objects and advantages thereof, will become apparent to those skilled in the art from the following detailed description, taken in conjunction with the annexed sheets of drawings on which, by way of preferred example only, are illustrated the preferred embodiments of this invention.

On the accompanying drawings:

Fig. 1 is a vertical sectional view of a preferred embodiment of the device in accordance with the present invention.

Fig. 2 is an enlarged fragmentary view of one portion of Fig. 1 illustrating the introduction of the color-controlling agent into the molten glass.

The present color-controlling device and process which are described herein have numerous important advantages over those methods of adding costly color-controlling elements to the batch as compounded wherein they are combined with the batch in unmelted form and introduced into the so-called "doghouse" end of the glass melting chamber. As pointed out, costly color-controlling ingredients such as selenium compounds cannot be fully utilized during the conversion of the raw batch to molten glass and frequently as much as 90% of the selenium is lost during the glass-melting operation. Thus, it is not uncommon for only about 10% of the total selenium content of the batch to serve effectively as the decolorizing or color-controlling medium.

While the present invention will be described as directed primarily to the application of selenium to molten glass to achieve color-control thereof, the invention is deemed to be fully applicable to the addition of other constituents to molten glass where for various reasons it may be desirable to add minor constituents to continuously-produced molten glass for additional refining or controlling the state of oxidation of the melt.

In a preferred embodiment of the present invention a refractory vessel or tank 10 having a floor or bottom portion 11 and upright sidewalls (not shown) is employed to retain the molten glass 12. The tank 10 may also consist of a refiner or a forehearth attached to the main melting chamber of the furnace to serve as a refining or distributing chamber for the molten glass. In other words, a prescribed area where the subject device may be disposed can be varied through extensive limits depending upon individual requirements for decolorizing or color-controlling the molten glass.

The molten glass 12 which is contained within tank 10 may be considered to possess various objectionable colorations such as slight bluish or greenish tints due to certain impurities contained within the glass batch from which the molten glass has been prepared. As known, some of these impurities may consist of various forms of iron or chromium or other impurities which must be counteracted by certain color-controlling compounds such as zinc selenate, barium selenate or sodium selenate.

The molten glass 12 retained within the tank 10 flows generally in the direction of from zone A to zone B or left to right as shown in Fig. 1.

An opening 13 is provided in the tank floor 11 within which is permanently mounted a hollow member 14 having an axial opening 15. Hollow member 14 which may be termed a "probe" has a hollow annulus 16 extending through the major portion of its length to serve as a cooling chamber. An inlet 17 and an outlet 18 are connected to an exterior portion of the annulus 16 for the introduction and exhaustion of a fluid coolant such as air or water adapted to cool the inner end of member 14 in contact with the glass 12.

Within the axial opening 15 is mounted a shaped solid rod-like element 19 containing the prescribed color-controlling reagent as well as selected fillers and compounding materials.

The element 19 is essentially one which is soluble in molten silicates and may be fabricated of powdered glass containing a rather high proportion of the color-controlling medium such as one or more selenium compounds or selenium metal. Selenium compounds may consist of selenates such as zinc selenate, barium selenate or sodium selenate and also may contain certain selenites. The element 19 may thus be formed to rod-like form by compounding prescribed amounts of the selenium-containing materials, powdered glass or other filler material, the rod being bonded together with sodium silicate for example.

Element 19 is mounted within opening 15 with sufficient surface clearance to permit its being continuously fed through member 14 into the molten glass 12.

A screw-threaded member 21 is axially mounted within opening 15 to interengage with the lower end 14a of the probe-like element. The threaded member 21 is adaptable to rotation and controlled movement from exteriorly of the glass body to near relationship by a variable speed motor 22 and an interconnecting drive pulley arrangement 23. Thus, with a prescribed speed established on motor 22, the threaded member 21 is adapted to convey the soluble element 19 into the molten glass at a prescribed rate.

As shown in Fig. 2, selenium-containing element 19 is dissolved by the molten glass 12 with the evolution of small bubbles of gas 20 which aid the dispersion of the selenium through the molten glass.

Mounted adjacent to the probe-like member 14 is a bubbler tube 24 extending through the tank floor 11, the bubbler tube having an axial opening 25 for the introduction of air. Air, inert gas such as nitrogen, or a slightly reducing gas containing a mixture of hydrogen and nitrogen, for example, as desired is introduced into the molten glass 12 in the form of gaseous bubbles 26. These bubbles serve to agitate the glass in the vicinity of the color-controlling device to increase the rate and extent of dissolution of the color-controlling agent throughout the molten glass.

The color-controlling medium which is introduced into the molten glass contained within the comprising a part of element 19 consists of preferably selenium in the form of metal or selenates or selenites although other color-controlling agents may also be suitably employed. When the valence of selenium introduced into the glass is zero, a slightly pink color is imparted into the glass. When the selenium has a positive valence of plus 2, 4 or 6, it serves to exert a decolorizing action on the molten glass. At this time brownish or bluish colorations in the glass are either neutralized or destroyed to the extent where the glass then becomes decolorized or completely transparent or completely neutral. When the valence of the selenium is minus 2, a brown coloration may be introduced into the glass. Therefore, it is desirable depending upon the desired results to utilize selenium having a positive valence for decolorizing action or a zero valence where a pinkish colored glass is desired.

As described earlier, molten glass soluble element 19 is conveyed into the molten glass 12 at a controlled rate depending upon the amount of selenium to be dissolved within the glass and the amount of glass being pulled. This amount is proportional to the amount of impurities in the glass to be decolorized and thus correction of objectionable coloration. Also the rate of introduction of the selenium is dependent upon the depth of glass retained within the tank, the amount of coloring effect to be exerted and the rate of removal of the glass from the color-controlling area.

Where a greater color-controlling action upon the glass is desired, the element 19 is fed into the glass beneath its surface at a greater rate so that an increased surface area thereof is exposed.

Upon consumption of element 19 the threaded member 21 is withdrawn and another similar rod or element 19 is inserted into the opening 15. The threaded element 21 is replaced and its feeding operation again commenced at the desired rate.

The present invention permits producing glass of a prescribed neutral or slightly pinkish color in quantities as small or as large as desired in continuous operations whatever the particular capacity of production of the plant may be. Furthermore, it permits rapidly converting from nearly neutral color to another color which may be slightly pinkish or slightly greenish or even brownish, whereas the above-described ordinary processes are entirely governed by the quantities of glass constituents which are introduced into the batch charges contained in the melting chamber. Considerable backlog of glass which may remain unused for some time prior to its actual use is necessitated and to a large extent, control over glass coloration is not nearly as well regulated.

The present invention has been found to be more than three times more effective in controlling glass color than when the color-controlling agent is placed in the batch. By following the prescribed method more than 90% and something of the order of 90 to 99% of the color-controlling agent is positively and effectively utilized to serve its intended purpose within the glass melt. The amount of selenium to be added may be about ¼ ounce per ton of container glass produced. This amount may also be expressed as about 11 ounces per 24 hour day on a 45 ton feeder.

It is entirely possible to utilize the present invention to simultaneously produce glasses of slightly different colors from a single glass melting tank in continuous operation by applying the subject device to a plurality of forehearths supplying individual feeders.

As desired each of the feeders may be capable of supplying neutral glass, slightly pink-colored or greenish glass, or brownish glass as desired to individual areas of use.

Various other modifications may be resorted to within the spirit and scope of the appended claims.

I claim:

1. The method of continuously producing a molten glass product having precisely controlled coloration including the steps of making a mass of molten glass from glass batch constituents, conveying the said molten glass to a point of use, arranging at least one essentially solid rod-like element in movable arrangement with one end portion thereof submerged below and projecting into said conveyed molten glass, said rod-like element being essentially fully dissolvable in said molten glass and containing selenium in color-controlling concentrated form, introducing the said rod-like element into said molten glass at a controlled rate to facilitate its dissolution therein depending essentially upon the composition and temperature of said molten glass contacting the submerged portion and the desired colorizing effect to be obtained by the said selenium, and effecting agitation of said molten glass into a homogeneous color-controlled glass product.

2. The method in accordance with claim 1 including the step of continuously moving said rod-like element forwardly into the said molten glass in submerged relation to introduce not more than about ¼ ounce of selenium per ton of glass produced.

(References on following page)

References Cited in the file of this patent

UNITED STATES PATENTS

| | | |
|---|---|---|
| 576,312 | Hirsch | Feb. 2, 1897 |
| 1,834,631 | Mulholland | Dec. 1, 1931 |
| 1,874,799 | Peiler | Aug. 30, 1932 |
| 1,938,716 | Norris | Dec. 12, 1933 |
| 2,115,408 | Brosse | Apr. 26, 1938 |
| 2,294,373 | Batchell | Sept. 1, 1942 |
| 2,495,956 | Cook | Jan. 31, 1950 |
| 2,593,197 | Rough | Apr. 15, 1952 |
| 2,819,891 | Graef | Jan. 14, 1958 |

FOREIGN PATENTS

| | | |
|---|---|---|
| 667,474 | Great Britain | Mar. 5, 1952 |

OTHER REFERENCES

Modern Glass Practice, Scholes, published by Industrial Publications, Chicago, Illinois, 1946, pages 188, 189, 193.